United States Patent
Heine

[15] 3,655,336
[45] Apr. 11, 1972

[54] PROCESS FOR THE CATALYTIC PRODUCTION OF HYDROXYL-AMMONIUM SALTS

[72] Inventor: Heinz Heine, Krefeld, Germany

[73] Assignee: Farbenfabriken Bayer Aktiengesellschaft, Leverkusen, Germany

[22] Filed: Oct. 15, 1969

[21] Appl. No.: 866,718

[30] Foreign Application Priority Data

Nov. 2, 1968   Germany.....................P 18 06 537.7

[52] U.S. Cl..............................................23/117, 23/190A
[51] Int. Cl. .......................................C01g 1/10, C01c 1/28
[58] Field of Search .......................................23/190 A, 117

[56] References Cited

UNITED STATES PATENTS 3,133,790   5/1964   Jockers...............................23/190 A

FOREIGN PATENTS OR APPLICATIONS 1,508,715   1/1968   France.....................................23/117

Primary Examiner—Oscar R. Vertiz
Assistant Examiner—H. S. Miller
Attorney—Connolly and Hutz

[57] ABSTRACT

Improvement in the process of reacting nitric oxide and hydrogen in an acid reaction medium in the presence of a catalyst of the platinum group which is suspended on graphite, active carbon or a mixture thereof wherein the process is carried out in the presence of carbon dioxide to improve the selectivity of the catalyst for hydroxyl ammonium salt production.

3 Claims, No Drawings

PROCESS FOR THE CATALYTIC PRODUCTION OF HYDROXYL-AMMONIUM SALTS

The present invention relates to a process for the catalytic production of hydroxyl-ammonium salts from nitric oxide and hydrogen in acid solution, which is characterized in that the reaction takes place in the presence of carbon dioxide.

It is known that hydrogen and nitric oxide can be reacted in an acid medium on noble metal catalysts to produce hydroxyl ammonium salts (German Patent specification No. 968,363 and German Auslegeschrift No. 1,177,118). Side by side with this may occur the formation of ammonium sulphate and nitrous oxide. Various proposals have been made to suppress the reaction which leads to ammonium sulphate, for example the use of lead, mercury, sulphur or selenium for selective catalyst poisoning (German Patent specification Nos. 945,752 and 956,038). Furthermore, it has been found that carbon monoxide or formic acid but not higher carboxylic acids can be used for the same purpose (Belgian Patent specification No. 692,976).

On further investigation into the optimum conditions for preparing hydroxylamine, it was surprisingly found that carbon dioxide is an effective agent for improving selectivity in the synthesis of hydroxylammonium sulphate from nitric oxide and hydrogen. This was all the less to be expected since carbon dioxide is used in many reactions as an inert gas. It has the advantage over carbon monoxide mentioned above of trouble-free dosing since it does not cause inactivation of the catalyst even when used in considerable quantities. It is more economical than formic acid. The minimum concentration depends on various factors. According to our experience, one may proceed on the basis that optimum results are achieved if the active centres of the catalyst are modified with carbon dioxide in the required sense, i.e. with a view to maximum hydroxylamine formation.

It is therefore first of all necessary to ensure a sufficient concentration of $CO_2$ in order to obtain the completest possible occupation of the active centres of the catalyst. As the reaction continues, it is then only necessary to supply further $CO_2$ in sufficient quantity to maintain the required occupation of the catalyst. If the reaction is carried out in an acid pH range, extremely small quantities of $CO_2$, practically at the limit of detectability, are sufficient. The concentrations of $CO_2$ to be employed thus depend largely on the reaction conditions. In a reactor equipped with a stirrer, for example, part of the waste gas is continuously returned by suction and recycled; the effective $CO_2$ content in the reaction gas thereby becomes greater than the value adjusted in the synthesis gas.

Optimum results were achieved with $CO_2$ concentrations in the synthesis gas of about 0.01 to 2 volumes per cent. Larger quantities are unnecessary and therefore uneconomical whereas, with substantially smaller quantities, the desired modification of the catalyst is achieved only after the synthesis has been carried out for a considerable time.

The process is otherwise carried out under the conditions known from the prior art, e.g. U.S. Pat. specification Nos. 2,628,889 and 3,406,011; the reaction takes place in solution in a mineral acid, preferably sulphuric acid, in which the catalyst material — platinum, palladium, rhodium, iridium, ruthenium and alloys thereof, preferably platinum, suspended on graphite or active carbon. The reaction is carried out in stirrer vessels which may be arranged singly or in series or in the form of cascades. Carbon dioxide is preferably added to the synthesis gas but may be introduced separately into the reaction vessels. The carbon dioxide may also be supplied in the form of carbonates or carbaminates.

The process will be explained more fully below with the aid of the Examples.

EXAMPLE 1

30 g. of a platinum/graphite catalyst containing approximately 1 percent of platinum were added to 1 l. of a 4N $H_2SO_4$ solution, and a mixture of 10 to 12 liters of nitric oxide per hour with double the quantity of hydrogen was introduced with stirring at 40° to 45° C. The catalyst was filtered off after 8 hours and was used again after the addition of fresh sulphuric acid. No $CO_2$ was added to the synthesis gas during the first two passes in this example whilst in the last two passes approximately 2 percent of $CO_2$ was added. The following conversion rates were achieved:

| Passes: | $CO_2$ content in the synthesis gas, percent | $CO_2$ content in the waste gas, percent | Conversion to hydroxyl ammonium sulphate, percent | Conversion to $N_2O$, percent | Selectivity, percent |
|---|---|---|---|---|---|
| 1 | 0 | 0 | 20 | 9 | 22 |
| 2 | 0 | 0 | 22 | 5 | 24 |
| 3 | 1.9 | 11.6 | 72 | 2 | 75 |
| 4 | 2.0 | 9.8 | 75 | 1 | 84 |

The values of the conversion rate are based on the amount of nitric oxide put into the process. The selectivity is defined as 100 times the ratio of mols of hydroxylammonium sulphate formed to the sum of hydroxyl-ammonium salt, ammonium salt and $N_2O$ formed.

The addition of carbon dioxide becomes noticeable especially towards the end of each reaction period. This is shown by the progress in conversion to $N_2O$ ($C_{N_2O}$) for two of the above mentioned reaction periods at intervals of 2 hours:

2nd pass (without $CO_2$) $C_{N_2O}(\%) = 0; 1; 1; 20$
4th pass (with $CO_2$) $C_{N_2O}(\%) = 0; 1; 1; 2$ The addition of carbon dioxide is therefore of interest especially for continuous synthesis in which the acid originally added to the reaction solution is used as far as possible.

EXAMPLE 2

25 g. of a platinum/graphite catalyst containing approximately 1 percent of platinum were added to 1 l. of 4N $H_2SO_4$, and a mixture of 10 to 12 l. of nitric oxide with approximately 1.7 times its quantity of hydrogen was introduced with stirring at approximately 40° C. The catalyst was filtered off after 8 hours and used again after the addition of fresh $H_2SO_4$. The nitric oxide used for this experiment was treated either with purified river water or with NaOH in a scrubbing tower. Gas scrubbed with NaOH was free from $CO_2$ but treating the gas with river water was a convenient way of adding small quantities of $CO_2$ which was dissolved in the river water.

Analysis to determine $CO_2$ was carried out gas chromatographically in the waste gas without previous concentration. The fact that there was only a slight decrease in selectivity during the fifth pass can be explained by the fact that the NO gas meter which was filled with water still contained dissolved

| Passes: | Method of scrubbing NO | $CO_2$ content in the synthesis gas, percent | $CO_2$ content in the waste gas percent | Conversion to hydroxylammonium sulphate percent | $N_2O$ percent | Selectivity, percent |
|---|---|---|---|---|---|---|
| 3 | $H_2O$ | 0.1 | 0.3 | 52 | 4 | 75 |
| 4 | $H_2O$ | 0.4 | 1.0 | 59 | 3 | 78 |
| 5 | NaOH | 0.0 | 0.0 | 48 | 6 | 63 |
| 6 | NaOH | 0.0 | 0.0 | 25 | 14 | 33 |
| 7 | NaOH | 0.0 | 0.0 | 22 | 13 | 34 |
| 12 | $H_2O$ | 0.6 | 1.5 | 65 | 2 | 88 |
| 13 | $H_2O$ | 0.6 | 1.5 | 68 | 3 | 89 | residues of CO₂ from the fourth pass, which were insufficient to be detected by gas chromatographic analysis but nevertheless were sufficient to improve the selectivity.

What is claimed is:

1. In the process of producing hydroxyl ammonium salt by catalytic hydrogenation of nitric oxide in a sulphuric acid medium with a catalyst of the platinum group suspended on graphite, active carbon or a mixture thereof, the improvement for increasing the selectivity of said catalyst for the production of hydroxyl ammonium salt which comprises contacting said catalyst during said hydrogenation with a selectivity improving amount of carbon dioxide.

2. The process of claim 1 wherein a carbon dioxide containing synthesis gas is employed.

3. The process of claim 2 wherein said synthesis gas contains $CO_2$ in an amount of from about 0.01 to 2 percent by volume.

* * * * *